United States Patent
Fawaz et al.

(10) Patent No.: US 8,891,593 B1
(45) Date of Patent: Nov. 18, 2014

(54) PEAKY BINNING RELAYING SCHEME FOR WIDEBAND/LOW SIGNAL-TO-NOISE RATIO (SNR) WIRELESS COMMUNICATIONS

(75) Inventors: Nadia Fawaz, Sunnyvale, CA (US); Muriel Medard, Belmont, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 577 days.

(21) Appl. No.: 13/226,221

(22) Filed: Sep. 6, 2011

Related U.S. Application Data (60) Provisional application No. 61/379,858, filed on Sep. 3, 2010.

(51) Int. Cl.
*H04B 7/15* (2006.01)
*H04L 25/20* (2006.01)

(52) U.S. Cl.
USPC .......................................... 375/211; 375/260

(58) Field of Classification Search
CPC ........... H04B 7/15528; H04B 7/15592; H04L 5/0053; H04L 2001/0097
USPC .......................... 375/211, 260; 370/315; 455/7
See application file for complete search history.

(56) References Cited

U.S. PATENT DOCUMENTS

| | | | |
|---|---|---|---|
| 8,301,078 B2 * | 10/2012 | Kim et al. | 455/10 |
| 2010/0008243 A1 * | 1/2010 | Viswanath et al. | 370/252 |
| 2010/0110969 A1 * | 5/2010 | Yu et al. | 370/315 |
| 2011/0032864 A1 * | 2/2011 | Lee et al. | 370/315 |

* cited by examiner

*Primary Examiner* — David B. Lugo
(74) *Attorney, Agent, or Firm* — Anderson Gorecki & Rouille LLP (57) ABSTRACT

A method, apparatus and computer program product for a peaky binning Relaying Scheme for Wideband/Low Signal-To-Noise Ratio (SNR) Wireless Communications is presented. In a computer system having a source node (S), a relay node (R) and a destination node (D), the method includes transmitting by S a message (m), wherein a first subset of m ($m_1$) is transmitted to R and wherein a second subset of m ($m_2$) is transmitted to D. The method further includes decoding by R a bin index from the $m_1$ and forwarding the bin index to D. Additionally the method includes receiving the bin index at D and decoding the bin index and receiving at D the $m_2$ and decoding the $m_2$. The method also includes determining by D the value of m from decoded values of the bin index and the $m_2$.

15 Claims, 9 Drawing Sheets

PEAKY BINNING RELAYING SCHEME FOR WIDEBAND/LOW SIGNAL-TO-NOISE RATIO (SNR) WIRELESS COMMUNICATIONS

CROSS REFERENCE TO RELATED APPLICATIONS

The present application claims the benefit of U.S. Provisional Patent Application No. 61/379,858 filed on Sep. 3, 2010, which is incorporated herein by reference in its entirety.

BACKGROUND

The general relay channel is among the smallest building blocks of communication networks, yet its capacity is still an open problem. Bounds on the capacity of the general relay channel, and the capacity of some particular classes of relay channels, have been derived in the past. In particular, the expression of the cut-set upper bound, and the generalized block-Markov lower bound were derived for the case of the Frequency-Division Additive White Gaussian Noise (FD-AWGN) relay channel, where the source and the relay transmit in different bands. However, despite a plethora of recent works proposing cooperative strategies for wireless relaying networks and studying their performance in the high Signal-to-Noise Ratio (SNR) regime, the capacity of the multipath fading relay channel remains unknown.

The presently described invention focuses on analyzing the multipath fading relay channel in the non-coherent setting, where neither the source, nor the relay, nor the destination have channel state information (CSI), and in the wideband regime, alternatively named low SNR regime. Indeed, in the wideband regime, power is shared among a large number of degrees of freedom, making the SNR per degree of freedom low. Thus the wideband regime is power limited, but not interference limited on the contrary to the high SNR regime. In the wideband regime, the capacity of the point-to-point AWGN channel and the capacity of the point-to-point non-coherent multipath fading channel were shown to be both equal to the received SNR:

$$C_{Fading} = C_{AWGN} = \frac{P}{N_o} = \lim_{W \to \infty} W \log\left(1 + \frac{P}{WN_o}\right).$$

Moreover, in the wideband limit of fading channels, spread-spectrum signals were shown to achieve poor performance, whereas peaky signals in time and frequency, such as low duty-cycle FSK, along with non-coherent detection, were shown to be capacity optimal. In particular, for the Single Input Multiple Output (SIMO) channel with two receive antennas with respective gains 1 and $a^2$, the capacity is $$C_{SIMO} = (1 + a^2)\frac{P}{N_o}.$$

Results on multiple user channels in the wideband limit include, the capacity region of the AWGN Broadcast Channel (BC), for which time-sharing was shown to be optimal, and the capacity region of the AWGN Multiple Access Channel (MAC), for which FDMA allows all sources to achieve their point-to-point interference-free capacity to the destination.

Some observations can be drawn from previous works on point-to-point and multiple user channels in the wideband regime: the capacity in the multipath fading case is the same as in the AWGN case, it can be reached in a non-coherent setting, and interference is not an issue.

Coming back to the non-coherent multipath fading relay channel in the wideband regime, two questions naturally arise. The present invention addresses these questions, namely whether the FD-AWGN lower bound can be achieved in the non-coherent multipath fading case and whether the cut-set upper-bound can be reached. Note that in the wideband regime, considering the FD channel is relevant and meets the relay half-duplex constraint. This present invention addresses these questions through three main contributions:

1) A hypergraph model of the wideband multipath fading relay channel is proposed.

2) The hypergraph min-cut is shown to be achieved in the non-coherent wideband multipath fading relay channel by a peaky frequency-binning scheme.

3) The hypergraph min-cut is shown to coincide with the generalized block-Markov lower bound on the capacity of the wideband FD-AWGN relay channel, and in certain channel configurations with the cut-set upper-bound, in which case it is equal to capacity.

SUMMARY

The present invention increases the communication rate and decreases the energy consumption in wireless networks with low signal-to-noise ratio (SNR) operating points, e.g. cellular networks, by utilizing low SNR relaying strategies.

The need for higher communication rates in wireless networks is motivated by the significant growth in the global mobile data traffic. This growth is due to an increase in the number of mobile phone subscribers and a change in their communication habits, moving from light-traffic voice to heavy-traffic media services, such as video. Indeed, at the end of 2008, the number of mobile phone subscribers exceeded 4 billions, and the global mobile data traffic has been predicted to grow 66 times between 2008 and 2013, with video representing almost 64 percents of the worlds mobile data traffic by 2013.

Conventional mechanisms such as those explained above suffer from a variety of deficiencies. One such deficiency associated with higher communication rates and the networks supporting them is the amount if energy required by these systems. Reducing the energy consumption of wireless networks is not only a matter of cost reduction and competitiveness, but also a question of sustainable development and environmental responsibility. First, reducing the energy consumption of cellular networks leads to greener communication systems. Information and communication technologies (ICT) contribute a direct 2-2.5 percents to the world's carbon emission. Second, the energy consumption supporting the wireless part of a communication link considerably dominates the energy consumption in the wired part of the link. The largest gains in terms of energy efficiency will come from improving wireless transmissions, and bringing the fiber as close as possible to the user thanks to smaller cells. Third, improving the energy consumption of cellular networks will speed the expansion of communication networks in developing countries, where power shortages currently limit their reach and their performance.

Embodiments of the invention significantly overcome such deficiencies and provide mechanisms and techniques that provide a peaky binning relay scheme for wideband/low SNR wireless communications.

A hypergaph model of the relay channel in the wideband limit is used, and it is shown that its min-cut can be achieved not only in the FD-AWGN case, but also in the non-coherent multipath fading case thanks to a relaying scheme combining peaky signals and binning. In certain channel configurations, the so-obtained achievable rate also coincides with the cut-set upper-bound, and thus is equal to the capacity of the non-coherent wideband multipath fading channel.

In the remaining cases, where the rate achieved by the proposed scheme does not coincide with the cut-set upper bound, a question remains open: can the gap to the cut-set upper-bound be closed? If the capacity of the relay-destination channel was infinite, as in the SIMO channel, the cut $(1+a^2)$ could be achieved, and the gap to the cut-set bound could be closed. However, because of the relay power constraint and the destination noise, the relay cannot make its received signal perfectly available to the destination as in the SIMO channel. This raises the question as to whether virtual MIMO gains can actually be achieved in the wideband regime.

In a particular embodiment of a method for providing a peaky binning relay scheme for wideband/low SNR wireless communications in a computer system having a source node (S), a relay node (R) and a destination node (D), the method includes transmitting by S a message (m), wherein a first subset of m ($m_1$) is transmitted to R and wherein a second subset of m ($m_2$) is transmitted to D. The method further includes decoding by R a bin index from the $m_1$ and forwarding the bin index to D. Additionally the method includes receiving the bin index at D and decoding the bin index and receiving at D the $m_2$ and decoding the $m_2$. The method also includes determining by D the value of m from decoded values of the bin index and the $m_2$.

Other embodiments include a computer readable medium having computer readable code thereon for providing for providing a peaky binning relay scheme for wideband/low SNR wireless communications. In a computer system having a source node (S), a relay node (R) and a destination node (D), the computer readable medium includes instructions for transmitting by S a message (m), wherein a first subset of m ($m_1$) is transmitted to R and wherein a second subset of m ($m_2$) is transmitted to D. The computer readable medium further includes instructions for decoding by R a bin index from the $m_1$ and forwarding the bin index to D. Additionally the computer readable medium includes instructions for receiving the bin index at D and decoding the bin index and receiving at D the $m_2$ and decoding the $m_2$. The computer readable medium also includes instructions for determining by D the value of m from decoded values of the bin index and the $m_2$.

Still other embodiments include a computerized system, configured to process all the method operations disclosed herein as embodiments of the invention. In such embodiments, the computerized system includes computer devices, each having a memory system, a processor, communications interface in an interconnection mechanism connecting these components. The memory system is encoded with a process that provides a peaky binning relay scheme for wideband/low SNR wireless communications as explained herein that when performed (e.g. when executing) on the processor, operates as explained herein within the computerized system to perform all of the method embodiments and operations explained herein as embodiments of the invention. Thus any computerized system that performs or is programmed to perform processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing a peaky binning relay scheme for wideband/low SNR wireless communications as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices.

Note that each of the different features, techniques, configurations, etc. discussed in this disclosure can be executed independently or in combination. Accordingly, the present invention can be embodied and viewed in many different ways. Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details, elements, and/or possible perspectives (permutations) of the invention, the reader is directed to the Detailed Description section and corresponding figures of the present disclosure as further discussed below.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

The following notations are used. $\mathbb{N}$ and $\mathbb{R}$ denote the sets of non-negative integers, and real numbers, respectively. Let $m \in \mathbb{N}$, the set of non-negative integers less or equal to m is denoted $\mathbb{N}_m \triangleq \{0,\ldots,m\}$. The subset $[0,+\infty[$ of $\mathbb{R}$ is denoted by $\mathbb{R}^+$. Let $x \in \mathbb{R}$, $(x)^+ \triangleq \max\{0,x\}$. Let S be a set, the indicator function is defined by $1_S(x)=1$ if $x \in S$, $1_S(x)=0$ if $x \notin S$. $\Pr\{A\}$ is the probability of event A, $E[\cdot]$ is the statistical expectation operator, and X is $CN(\mu, \sigma^2)$ means that X is a circularly symmetric complex Gaussian random variable with mean $\mu$ and variance $\sigma^2$.

Figure 1:
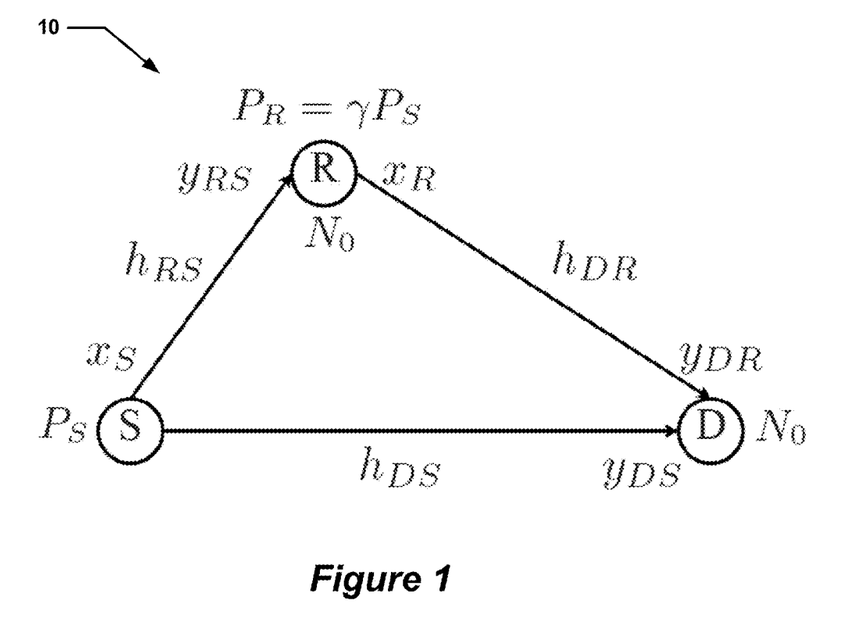
FIG. 1 depicts a block diagram of a system including a Source, a Relay, and a Destination having a multipath fading relay channel in accordance with embodiments of the invention.

Referring now to FIG. 1 a wideband multipath fading relay channel is shown. The three node network 10 shows a source S, a relay R and a destination D each equipped with a single antenna. S and R are assumed to have average power constraints in the time-continuous channel model of $P_S$ and $P_R = \gamma P_S$ Joules/s respectively. It is assumed that S, R and D have no channel state information (CSI), thus the multipath channel is considered in the non-coherent regime. In order to respect the half-duplex constraint at the relay, it is assumed that source S and relay R transmit in two different frequency bands of respective width $W_S$ and $W_R$. During each temporal block of duration T, S transmits a new codeword which R and D receive in the first frequency band; R performs some transformation on the signal received from S in the previous block and relays it to D in the second frequency band; D decodes a new codeword by processing the signals it received from S and R.

The continuous-time multipath fading channel between transmitter $u \in \{S,R\}$ and receiver $v \in \{R,D\}$ is represented by the impulse response $$h_{vu}(t) = \sum_{l=1}^{L_{vu}} a_{vu,l}(t)\delta(t - d_{vu,l}(t)),$$

where $L_{vu}$ is the number of paths, and $a_{vu,l}(t)$ and $d_{vu,l}(t)$ are the gain and delay of path l at time t. For the sake of simplicity, it is assumed that all channels $h_{vu}$, $u \in \{S,R\}$, $v \in \{R,D\}$ have similar coherence-time $T_c$ and delay-spread $T_d$. Also considered is a block-fading model where the processes $\{a_{vu,l}(nT_c)\}$ and $\{d_{vu,l}(t)\}$ have constant values $\{a_{vu,l}(nT_c)\}$ and $\{d_{vu,l}(nT_c)\}$ over intervals $[nT_c, (n+1)T_c[$. Furthermore the processes $\{a_{vu,l}(nT_c)\}$ and $\{d_{vu,l}(nT_c)\}$ are assumed to be independent, stationary and ergodic. Finally, let a, $b \in \mathbb{R}^+$, and assume a non-symmetric network, with stationary total channel gains $$\sum_{l=1}^{L_{DS}} E[|a_{DS,l}(0)|^2] = 1, \sum_{l=1}^{L_{RS}} E[|a_{RS,l}(0)|^2] = a^2,$$

$$\sum_{l=1}^{L_{DR}} E[|a_{DR,l}(0)|^2] = b^2.$$

A signal $x_u(t)$ transmitted in channel $h_{vu}(t)$ leads a received signal $$y_{vu}(t) = \sum_{l=1}^{L_{vu}} a_{vu,l}(t)x_u(t - d_{vu,l}(t)) + z_v(t),$$

where $Z_v(t)$ is a white Gaussian noise process with power spectral density $N_0/2$.

As the band grows large, the capacity of the point-to-point non-coherent wideband multipath fading channel is equal to the received SNR. Thus, the capacities of the point-to-point wideband channels between the source and the destination, the source and the relay, and the relay and the destination are respectively $$C_{DS} = \frac{P_S}{N_0}, C_{RS} = a^2 \frac{P_S}{N_0}, \text{ and } C_{DR} = b^2 \frac{P_R}{N_0}.$$

A hypergraph model of the wideband multipath fading relay channel is introduced and is used to show that the hypergraph min-cut is achieved by a non-coherent relaying scheme based on peaky signals, and the hypergraph min-cut is compared with bounds on the capacity of the FD-AWGN relay channel.

Figure 2:
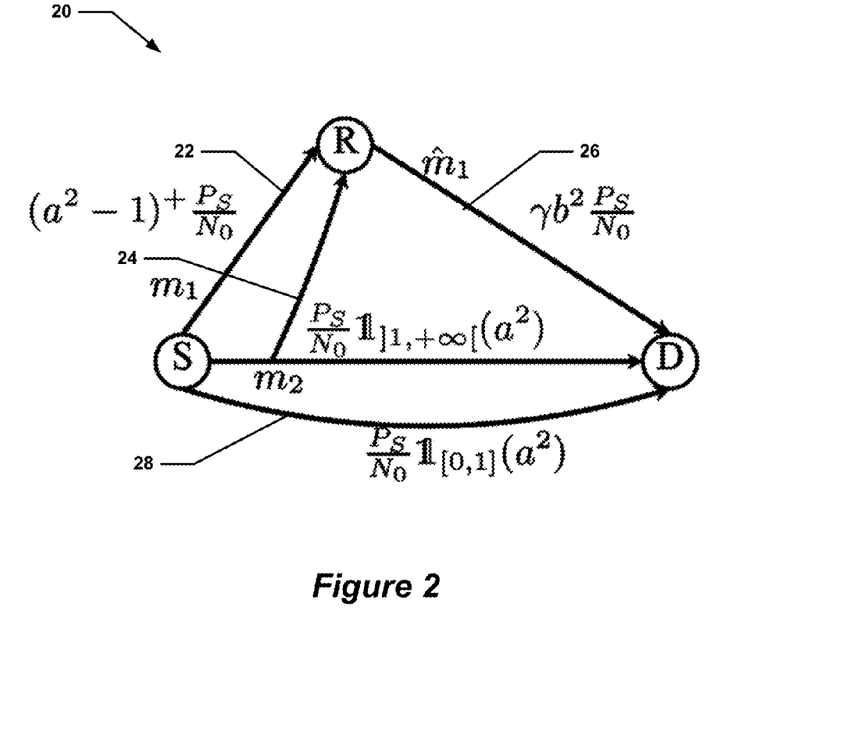
FIG. 2 depicts a hypergraph model of the system of FIG. 1 in accordance with embodiments of the invention.

The proposed hypergraph model 20 of the wideband relay channel is depicted in FIG. 2. A hyper edge connects a transmitting node to several receiving nodes. A message transmitted over a hyperedge at a rate below its capacity can be decoded reliably by all the receiving nodes. Messages transmitted over disjoint hyperedges are independent. This hypergraph model 20 of the relay channel is motivated by the broadcast nature of the wireless link: when a source transmits a signal over the wireless link, several receiving nodes can overhear the signal and extract some of the information transmitted by the source. The hypergraph model allows to clarify the correlation between the piece of information decoded at different receiving nodes, by breaking the wireless link from a transmitting node into a set of hyperedges carrying independent messages.

In this hypergraph, the hyperedge 24 represents a reliable channel from the source to both the relay and the destination with capacity $$\frac{P_S}{N_0} 1_{[1,+\infty]}(a^2),$$

while the edge 22 and edge 28 represent extra reliable channels to the relay only with capacity $$(a^2 - 1) + \frac{P_S}{N_0}$$

and to the destination only with capacity $$\frac{P_S}{N_0} \mathbb{1}_{[0,1]}(a^2),$$

respectively. Note that channel 28 cannot coexist simultaneously with the channels 22 and 24. Edge 26 represents a reliable channel from the relay to the destination with capacity $$\gamma b^2 \frac{P_S}{N_0}.$$

When the system bandwidth $W_S + W_R$ grows large,
1) a lower bound on the capacity is provided by the min-cut on the hypergraph $$R = \min\{\max\{1, a^2\}, (1 + b^2\gamma)\} \frac{P_S}{N_0}\left(1 - 2\frac{T_d}{T_c}\right). \quad (1)$$

2) this achievable rate (1) is equal to the wideband limit of the generalized block Markov lower bound of the FD-AWGN channel with the same received SNRs in the point-to-point source-destination, source-relay, and relay-destination channels when the channel is underspread ($T_d \ll T_c$).

3) in the case where $a^2 \geq 1 + b^2\gamma$ and $T_d \ll T_c$, this achievable rate (1) is equal to the FD-AWGN cut-set upper-bound $$(1 + b^2\gamma)\frac{P_S}{N_0},$$

and it is therefore the capacity of the non-coherent wideband multipath fading channel.

When the system bandwidth grows large, the cut-set upper bound converges to $$C_{FD-AWGN} \leq \min\{(1 + a^2), (1 + \gamma b^2)\}\frac{P_S}{N_0} \quad (2)$$

and the generalized block-Markov lower bound converges to $$C_{FD-AWGN} \geq \min\{\max\{1, a^2\}, (1 + \gamma b^2)\}\frac{P_S}{N_0} \quad (3)$$

Comparing (1) and (3) shows that the lower bounds on the capacity of the non-coherent multipath fading relay channel and the FD-AWGN channel coincide in the wideband limit when the channel is underspread ($T_d \ll T_c$). This shows that the hypergraph model is also valid in the FD-AWGN case.

In the case where $a^2 \geq 1 + b^2\gamma$ and the channel is underspread ($T_d \ll T_c$), the bounds (1), (3) and (2) coincide. The capacity of the multipath fading relay channel with infinite bandwidth cannot exceed the cut-set upper bound of the infinite bandwidth AWGN relay channel. It can then be concluded that $$(1 + b^2\gamma)\frac{P_S}{N_0}$$

is the capacity of the non-coherent wideband multipath fading channel in that case.

Figure 4:
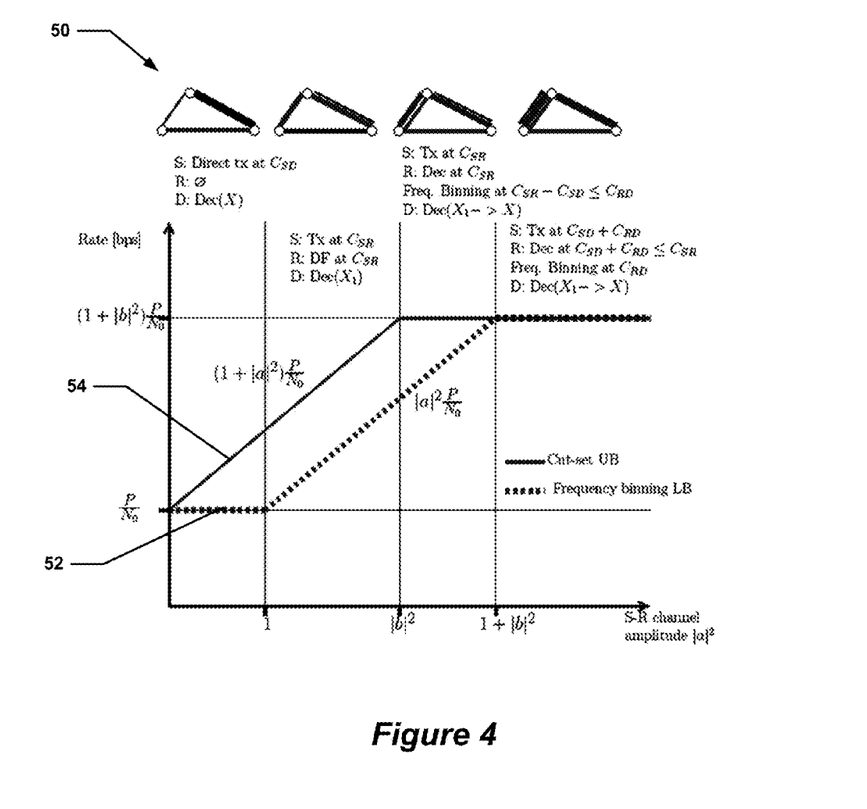
FIG. 4 depicts the bounds on the capacity of a non-coherent wideband multipath fading relay channel in accordance with embodiments of the invention.

The multipath fading achievable rate (1) and the FD-AWGN cut-set upper-bound (2) are plotted in graph 50 of FIG. 4 as lines 52 and 54 respectively, in the case where $1 < \gamma b^2$.

Figure 3:
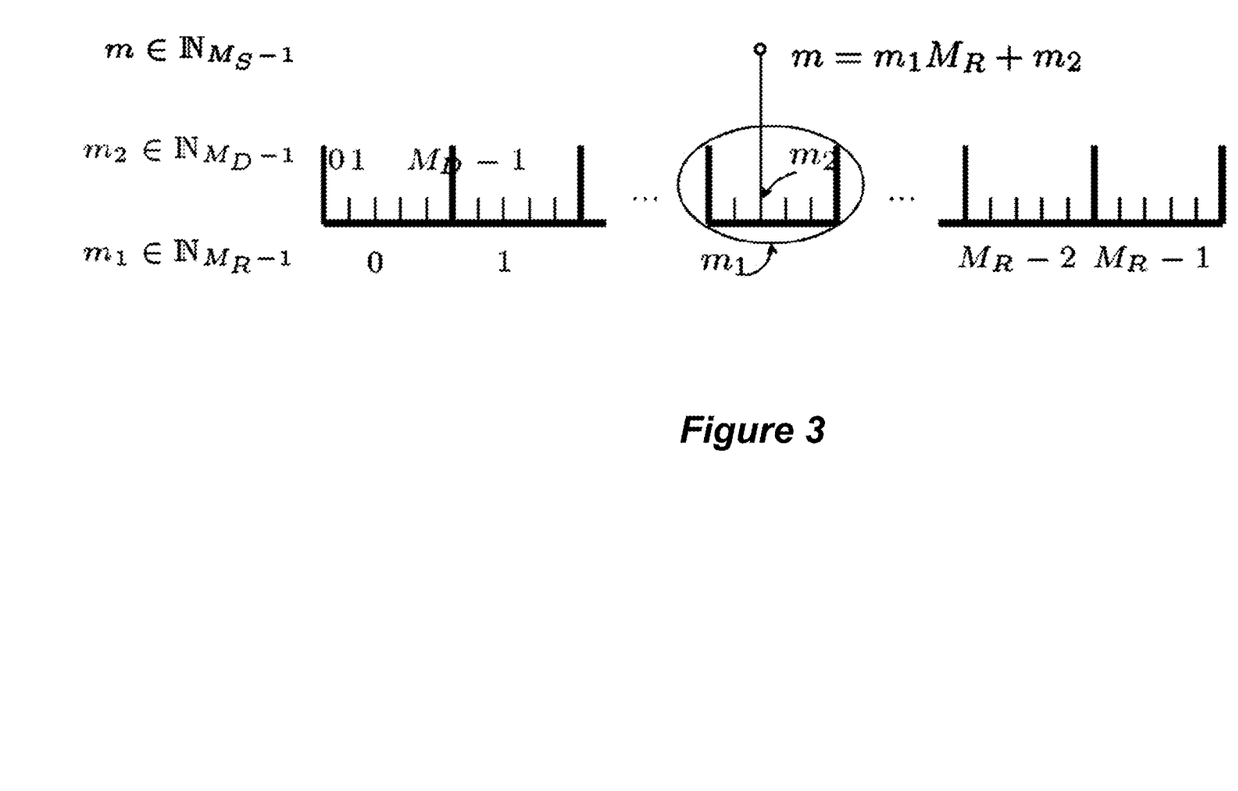
FIG. 3 depicts a peaky binning signaling scheme in accordance with embodiments of the invention.

The non-coherent scheme which achieves the hypergraph min-cut in the multipath fading case will now be explained. Let $M_S$, $M_R$ and $M_D$ be positive integers such that the codebook size at source is $M_S = M_R M_D$. Consider a couple of independent random integers $(m_1, m_2)$ such that $m_1 \in \mathbb{N}_{M_R-1} \triangleq \{0, \ldots, M_R-1\}$, $m_2 \in \mathbb{N}_{M_D-1} \triangleq \{0, \ldots, M_{D-1}\}$. Then the Euclidian division theorem ensures that there exists a unique source message $\in \{0, \ldots, M_S-1\}$ such that $m = m_1 M_D + m_2$. The representation of m as a couple $(m_1, m_2)$ has a binning interpretation. Indeed, the $M_S$ messages can be grouped into $M_R$ bins of $$M_D = \frac{M_S}{M_R}$$

messages. The integer $m_1$ represents the bin index of message m, while $m_2$ is the index of message m within bin $m_1$, as illustrated in FIG. 3. For $m_1 \in \mathbb{N}_{M_R-1}$, the $m_1$th bin is denoted $bin_{m_1}$ and contains the $M_D$ messages $bin_{m_1} = \{m_1 M_D, \ldots, m_1 M_D + M_D - 1\}$.

During the first block of the cooperative transmission scheme, the source transmits a message m using the peaky signaling scheme, which was shown to achieve capacity in the wideband regime. The transmission scheme is based on Frequency Shift Keying (FSK) and low-duty cycle, and is therefore peaky both in frequency and time. The duty-factor is denoted by $\theta \in ]0,1]$, representing the fraction of time during which the source actually transmits power. If the source transmits power during $T_S$, then the time separating two successive transmissions is $T_S/\theta$. Using FSK the transmitted signal corresponding to m-th message is given in the baseband by a sinusoid at frequency $f_m$ with power $P_S/\theta$.

$$x_S(t) = \begin{cases} \sqrt{\frac{P_S}{\theta}} \exp(j2\pi f_m t), & 0 \leq t \leq T_s \\ 0, & T_s \leq t \leq T_s/\theta, \end{cases} \quad (4)$$

where the transmission duration is chosen to be shorter than the coherence time $T_S \leq T_C$. Frequencies $f_m$ are taken to be integer multiples of $1/(T_s - 2T_d)$, leading to a minimum bandwidth $W_S = M_S/(T_s - 2T_d)$ for a codebook size $M_S$.

During the interval $[T_d, T_s - T_d]$ the processes $\{a_{RS,i}(t)\}$ and $\{d_{RS,i}(t)\}$ are constant, thus the signal received by the relay, when message m is sent, is given by:

$$y_{RS}(t) = \sum_{l=1}^{L_{RS}} \alpha_{RS,l} \sqrt{\frac{P_S}{\theta}} \exp(j2\pi f_m(t - d_{RS,l})) + z_R(t)$$

$$= G_{RS}x_S(t) + z_R(t),$$

where $$G_{RS} = \sum_{l=1}^{L_{RS}} \alpha_{RS,l} \exp(-j2\pi f_m d_{RS,l})$$

is the complex gain of the source-relay channel during $[T_d, T_s-T_d]$.

The complex gain for the source-destination channel is $$G_{DS} = \sum_{l=1}^{L_{DS}} \alpha_{DS,l} \exp(-j2\pi f_m d_{DS,l})$$

and the signal received by the destination during $[T_d, T_s-T_d]$ is $y_{DS}(t) = G_{DS}x_S(t) + z_D(t)$. The source repeats the transmission of a symbol N times over N disjoint time intervals $$\frac{T_S}{\theta}$$

to obtain diversity. Both the relay and the destination receive the N signals corresponding to message m during the first temporal block of total duration $$T = \frac{NT_S}{\theta}.$$

To transmit a codeword carrying $\ln M_S$ nats of information, an average power $P_S$ is used, and the source rate is given by $$R \triangleq \frac{\theta}{NT_S}$$

$\ln M_S$. Note that the source rate can be written $R = R_1 + R_2$, with $$R_1 \triangleq \frac{\theta}{NT_S}$$

$\ln M_R$ and $$R_2 \triangleq \frac{\theta}{NT_S} \ln M_D.$$

Upon reception of the N source signals, the relay first decodes the bin index $\hat{m}_1$ then it forwards $\hat{m}_1$ to the destination using peaky signaling. Note that if the number of bins was set to $M_R = 1$ single bin, this would render the relay unused, and correspond to a direct transmission from S to D.

The next step is to decode $\hat{m}_1$ by correlating. The relay correlates the $n^{th}$ received signal against each frequency $k \in \mathbb{N}_{M_S-1}$, forming the correlations $$R_{RS,k}(n) \triangleq \frac{1}{\sqrt{N_0(T_s - 2T_d)}} \int_{T_d}^{T_s-T_d} y_{RS}(t) \exp(-j2\pi f_k t) dt = \qquad (5)$$

$$\delta_{km} \sqrt{\frac{P_S(T_s - 2T_d)}{\theta N_0}} G_{RS}(n) + W_k(n)$$

where $G_{RS}(n)$ is the complex gain in interval n, $\{W_k(n)\}_n$, are i.i.d. circularly symmetric complex Gaussian random variables with unit-variance. By modeling assumption, $\{G_{RS}(n)\}_n$, are i.i.d. complex random variables. Assuming a large number of paths, $\{G_{RS}(n)\}_n$, can be modeled by i.i.d. circularly symmetric complex Gaussian random variables with 0-mean and variance $a^2$. Then for each k, $(R_k(n))$ are i.i.d. $CN(0, \sigma_k^2)$ with variances:

$$\sigma_k^2 = 1 + \delta_{km} \frac{a^2 P_S(T_s - 2T_d)}{\theta N_0}, k \in \mathbb{N}_{M_S-1} \qquad (6)$$

Note that $\sigma_k^2 = 1$ for all $k \neq m$. The relay decoder builds the decision variables $$S_{RS,k} = \frac{1}{N} \sum_{n=1}^{N} |R_{RS,k}(n)|^2 \qquad (7)$$

which for all $k \neq m$ are i.i.d. These decision variables are compared with the threshold $$A_R = 1 + (1 - \epsilon) \frac{a^2 P_S(T_s - 2T_d)}{\theta N_0}$$

with $\epsilon \in ]0, 1[$ to determine the set $S_R$ of bins containing at least one frequency above threshold:

$$S_R \triangleq \{k \in \mathbb{N}_{M_R-1} : \exists l \in bin_k \text{ s.t. } S_{RS,l} \geq A_R\}. \qquad (8)$$

If $S_R$ only contains a single bin k, the relay decodes $\hat{m}_1 = k$, otherwise it declares an error.

The next step involves forwarding the bin index $\hat{m}_1$. If the relay has not declared an error at the end of Phase 1, then it forwards the bin index $\hat{m}_1$ to the destination using peaky FSK in the second frequency band, with duty cycle $\theta$ and frequencies multiple of $1/(T-2T_d)$. Similarly to the source, the relay repeats N times the transmission of $\hat{m}_1$ over disjoint intervals of duration $$\frac{T_s}{\theta}$$

for diversity. In the n-th interval, during the fraction $\theta$ of time where the relay signal is non-null, the signal is given by $$x_R(t) = \sqrt{\frac{P_R}{\theta}} \exp(j2\pi \bar{f}_{\hat{m}_1} t).$$

During the interval $$\left[(N+n-1)\frac{T_s}{\theta}+T_d, (N+n)\frac{T_s}{\theta}-T_d\right],$$

of length ($T_s$, $-2T_d$), the signal received by the destination, corresponding to the n-th relay signal, can be written $y_{DR}(t)=G_{DR}x_R(t)+z_D(t)$, where $$G_{DR} = \sum_{l=1}^{L_{DR}} a_{DR,l} \exp(-j2\pi f_{\hat{m}_1} d_{DR,l})$$

is the complex gain of the relay-destination channel. To transmit a codeword carrying ln $M_R$ nats of information, a minimum bandwidth $W_R = M_R/(T_s, -2T_d)$, and an average power $P_R$ are used, and the relay rate is given by $$R_1 = \frac{\theta}{NT_s} \ln M_R.$$

At the end of the second phase, the destination has received 2N signals corresponding to the same message m, half coming from the source, and half being the retransmissions from the relay. The destination first processes the signal from the relay to decode the bin index $m_1$, then the signal from the source to decode the remaining index $m_2$.

The next step involves decoding the bin index $\hat{m}_1$. The destination correlates the N signals from the relay against each of the $M_R$ frequencies in the second band, to form the correlations $R_{DR,k}(n)$, for $n \in \mathbf{N}_N$, and $k \in \mathbf{N}_{M_R-1}$, given by $$R_{DR,k}(n) = \delta_{k\hat{m}_1} \sqrt{\frac{P_R(T_s - 2T_d)}{\theta N_0}} G_{DR}(n) + W_{R,k}(n),$$

where $\{W_{R,k}(n)\}$ are i.i.d. CN(0, 1). Assuming a large number of paths, $\{G_{DR}(n)\}_n$ are modeled by i.i.d. CN(0, $b^2$) random variables. Then, for each $k \in \mathbf{N}_{M_R-1}$, the variables $\{R_k(n)\}_n$ are i.i.d. CN(0, $\sigma_{R,k}^2$) with variances $$\sigma_{R,k}^2 = 1 + \delta_{k\hat{m}_1} \frac{b^2 P_R(T_s - 2T_d)}{\theta N_0}.$$

The destination compares the decision variables $$S_{DR,k} = \frac{1}{N} \sum_{n=1}^{N} |R_{DR,k}(n)|^2$$

with the threshold $$B_R = 1 + (1 - \epsilon_1) \frac{b^2 P_R(T_s - 2T_d)}{\theta N_0}$$

and builds the set $S_1 = \{k \in \mathbf{N}_{M_R-1} : S_{DR,k} \geq B_R\}$. If $|S_1|=1$, the destination decodes $\hat{m}_1$, otherwise it declares an error.

The next step involves decoding the index $\hat{m}_2$. If the destination has not declared an error at the end of the previous step, it can proceed with the decoding by processing the signal it received from the source in the previous block. The destination uses $\hat{m}_1$ to locate the bin of $M_D$ frequencies containing the source message m in the signal $y_{DS}$. The destination correlates the N messages it received from the source against the $M_D$ frequencies in $\text{bin}_{[|\$]\$ \hat{\ } \$\$[|\$]\$ \hat{\ } A\hat{x}\hat{m}_1} = \{\hat{m}_1 M_D, \ldots, \hat{m}_1 M_D + M_D - 1\}$ to form the correlations $R_{DS,l}(n)$, for $n \in \mathbf{N}_N$, and $l \in \text{bin}_{[|\$]\$ \hat{\ } \$\$[|\$]\$ \hat{\ } A\hat{x}\hat{m}_1}$ $$R_{DS,l}(n) = \delta_{lm} \sqrt{\frac{P_S(T_s - 2T_d)}{\theta N_0}} G_{DS}(n) + W_{S,l}(n). \quad (9)$$

where $\{W_{S,l}(n)\}_n$ are CN(0, 1), and for each l, the variables $\{R_{DS,l}(n)\}$ are i.i.d. CN(0, $\sigma_{S,l}^2$) with variances $$\sigma_{S,l}^2 = 1 + \delta_{lm} \frac{P_S(T_s - 2T_d)}{\theta N_0}, l \in \text{bin}_{\hat{m}_1}.$$

It should be pointed out that the relayed signal allows the destination to reduce the dimension of the space in which it looks for the source message m. More precisely, the relayed message allows the destination to reduce the number of noisy frequencies, to which it needs to compare the signal $y_{DS}$, from $M_S = M_R M_D$ to $M_D$. This observation is critical in the wideband regime where performance is mainly impaired by noise. For $l \in \text{bin}_{[|\$]\$ \hat{\ } \$\$[|\$]\$ \hat{\ } A\hat{x}\hat{m}_1}$ the destination builds the decision variables $$S_{DS,l} = \frac{1}{N} \sum_{n=1}^{N} |R_{DS,l}(n)|^2.$$

By comparing them with $$B_S = 1 + (1 - \epsilon_2) \frac{P_S(T_s - 2T_d)}{\theta N_0}$$

it builds the set $S_2 = \{l \in \text{bin}_{[|\$]\$ \hat{\ } \$\$[|\$]\$ \hat{\ } A\hat{x}\hat{m}_1} : S_{DS,l} \geq B_S\}$. If $|S_2|=1$, the destination decodes $\hat{m}_2$, otherwise it declares an error. If the destination decoder passes the two previous steps without declaring an error, the destination forms the final decoded message $\hat{m} = \hat{m}_1 M_D + \hat{m}_2$.

The correspondence between the min-cut achieving scheme, and the hypergraph model in FIG. 2 will now be explained. The relaying scheme is a form of selective decode-and-forward, where the minimum amount of relayed information depends on the quality of the source-relay channel $$C_{RS} = a^2 \frac{P_s}{N_o}$$

with respect to the channels $$C_{DS} = \frac{P_s}{N_o}$$

and $$C_{DR} = b^2 \gamma \frac{P_s}{N_o}.$$

Indeed, the amount of information forwarded by the relay is parameterized by the value of $M_R$, relatively to $M_S = M_R M_D$. Three different regimes can be identified, as shown in FIG. 4.

Regime $a^2 \leq 1$: in this regime $C_{RS} \leq C_{DS}$, the source-destination channel is more reliable than the source-relay channel. The source transmits directly to the destination at capacity $$C_{DS} = \frac{P_s}{N_o}$$

without using the relay. This is equivalent to setting the number of bins to a single bin, $M_R = 1$, containing all messages $M_D = M_S$. The achievable rate R=

$$C_{DS} = \frac{P_s}{N_o}$$

is given by the sum of the capacities of the source-destination hyperedge 28 of FIG. 2.

Regime $1 < a^2 \leq 1 + b^2\gamma$: in this regime $C_{DS} < C_{RS} \leq C_{DS} + C_{DR}$, the source-relay channel is stronger than the source-destination channel but weaker than the cut on the multiple-access (MA) side, S transmits m at rate $$R = C_{RS} = a^2 \frac{P_s}{N_o}$$

by splitting m into submessages $m_2$ sent on the hyperedge 24 in FIG. 2 at rate $$R_2 = C_{DS} = \frac{P_s}{N_o},$$

and $m_1$ sent on the hyperedge 22 at rate $$R_1 = C_{RS} - C_{DS} = (a^2 - 1)\frac{P_s}{N_o}.$$

R decodes and reliably forwards the bin index $\hat{m}_1$ to D on the hyperedge 24 since $$R_1 \leq C_{DR} = b^2 \gamma \frac{P_s}{N_o}.$$

D will use the signals from R and S to decode the remaining index $\hat{m}_2$. The number of bins is chosen $M_R \in ]1, M_S[$ such that $M_D$ matches the capacity of the source-destination channel, and $M_R$ can be handled by the source-relay and relay-destination channels. The achievable rate $$R = C_{RS} = a^2 \frac{P_s}{N_o}$$

is given by the sum of the capacities of the hyperedges 22 and 24.

Regime $1 + b^2\gamma < a^2$: in this regime $C_{DS} + C_{DR} < C_{RS}$, the source-relay channel is better than the multiple-access cut. S transmits at a rate equal to the capacity of the MA cut $$R = C_{DS} + C_{DR} = (1 + b^2\gamma)\frac{P_s}{N_o},$$

by splitting m into submessages $m_2$ sent on hyperedge 24 at rate $$R_2 = C_{DS} = \frac{P_s}{N_o},$$

and $m_1$ sent on hyperedge 22 at rate $$R_1 = C_{DR} = \gamma b^2 \frac{P_s}{N_o} \leq C_{RS} = a^2 \gamma \frac{P_s}{N_o}.$$

R decodes and forwards the bin index $\hat{m}_1$ to D. The destination uses the signals from S and R to decode the remaining $m_2$. The number of bins $M_R \in ]1, M_S[$ matches the capacity of the relay-destination channel, and $M_D \in ]1, M_S[$ matches the capacity of the source-destination channel. The achievable rate $$R = C_{DS} + C_{DR} = (1 + b^2\gamma)\frac{P_s}{N_o}$$

is given by the sum of the capacities of hyperedges 24 and 26.

In those three regimes, the achievable rate is given by the hypergraph min-cut. The relationship between the rate achieved by the peaky frequency binning scheme and the min-cut on the hypergraph appears as a simple tool to derive achievable rates, and the corresponding transmission schemes, in larger wideband relaying networks.

Encouraged by the results on small relaying networks in the low SNR, and the gains resulting from using network coding in relay networks, the use of relaying at the physical layer, with network coding in the digital domain, is seen a sustainable and reasonable solution.

The results described above have two major consequences for larger relay networks. First, there exists a simple relationship between the rate achieved by the peaky binning scheme and the min-cut on the hypergraph. This relationship appears as a simple tool to derive achievable rates, and the corresponding transmission schemes, in larger wideband relaying networks. Second, in the low SNR regime, coding should be kept in the digital domain, to avoid wasting energy on noise forwarding. Thus, in networks containing more nodes, the peaky binning scheme can be combined with digital network coding over the relaying hypergraph. These results can be extended to larger wireless relay networks, containing more nodes.

Figure 5:
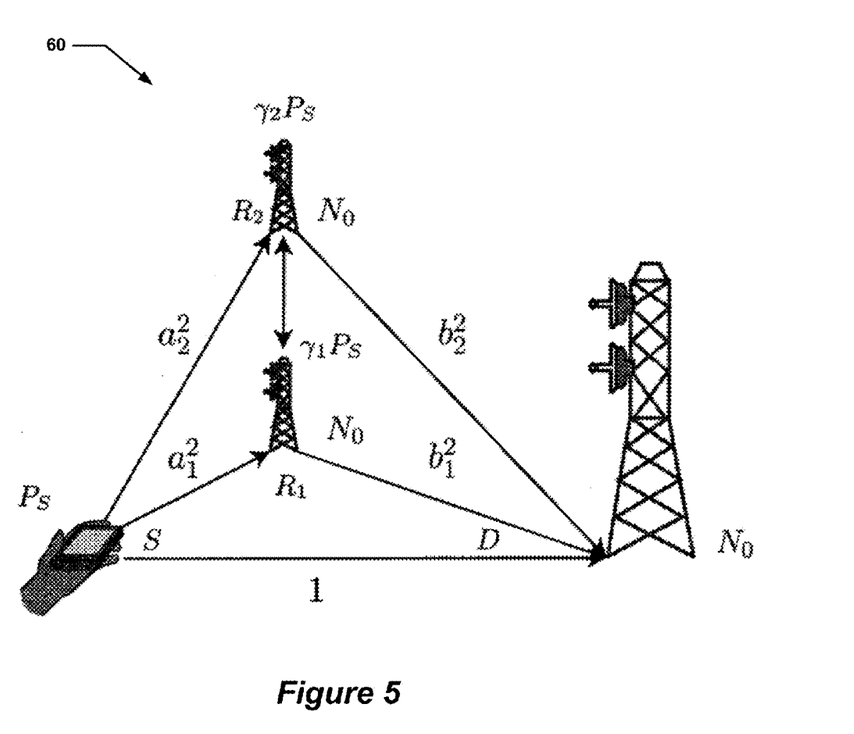
FIG. 5 depicts a block diagram of a relaying network having multiple relays in accordance with embodiments of the invention.
Figure 6:
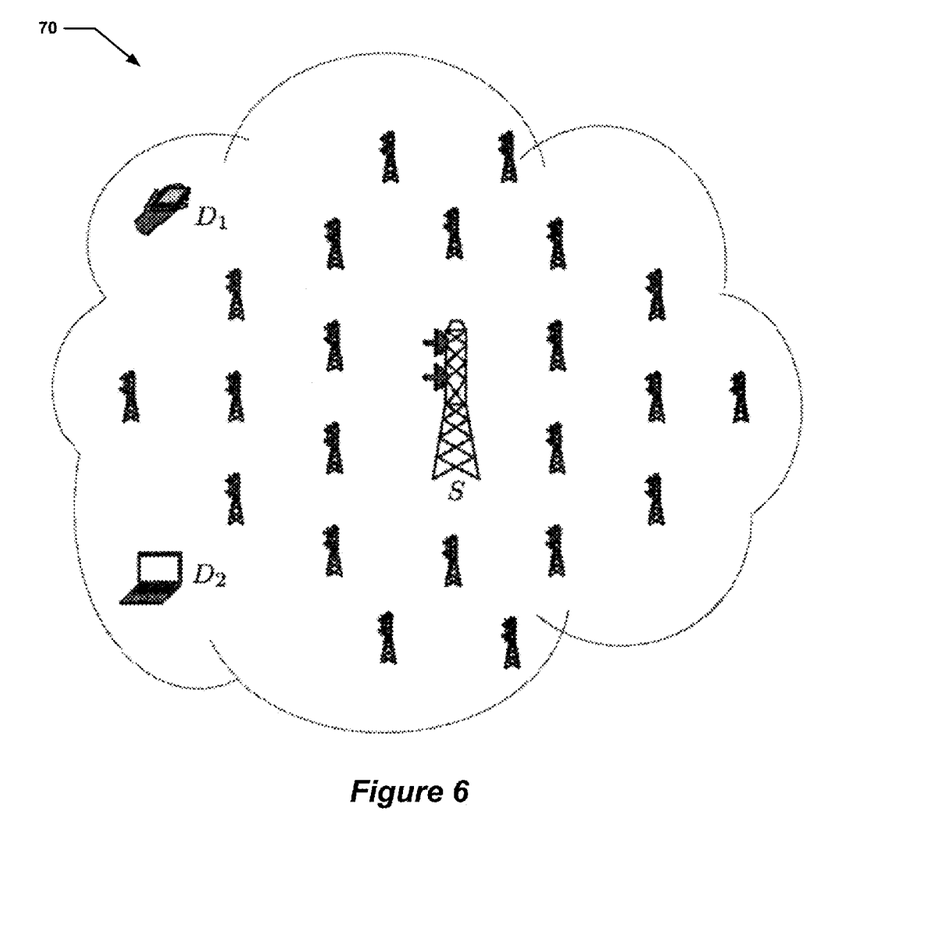
FIG. 6 depicts a block diagram of a relaying network having multiple relaying layers in accordance with embodiments of the invention.

The results can be extended to a system with a larger number of relays, as shown in environment 60 of FIG. 5 and further to a system 70 with multiple layers of relays as shown in FIG. 6. Adding a larger number of relays is motivated by the following equation:

$$C_{hg} = \min\{\max\{1, a^2\}, (1 + \gamma b^2)\}\frac{P_s}{N_o}.$$

Based on this equation, it can be expected that that increasing the number of relays will provide larger diversity gain and virtual MIS0 gain. The hypergraph model, as well the peaky binning scheme, will need to be generalized to an arbitrary number of relay nodes. When the network contains more than one relay, the wireless links between the relays need to be taken into account, which adds complexity to the system.

When the number of nodes in the network becomes large, applying random network coding becomes relevant. The following example illustrates the benefits of combining relaying and digital network coding in the low SNR regime.

Figure 7:
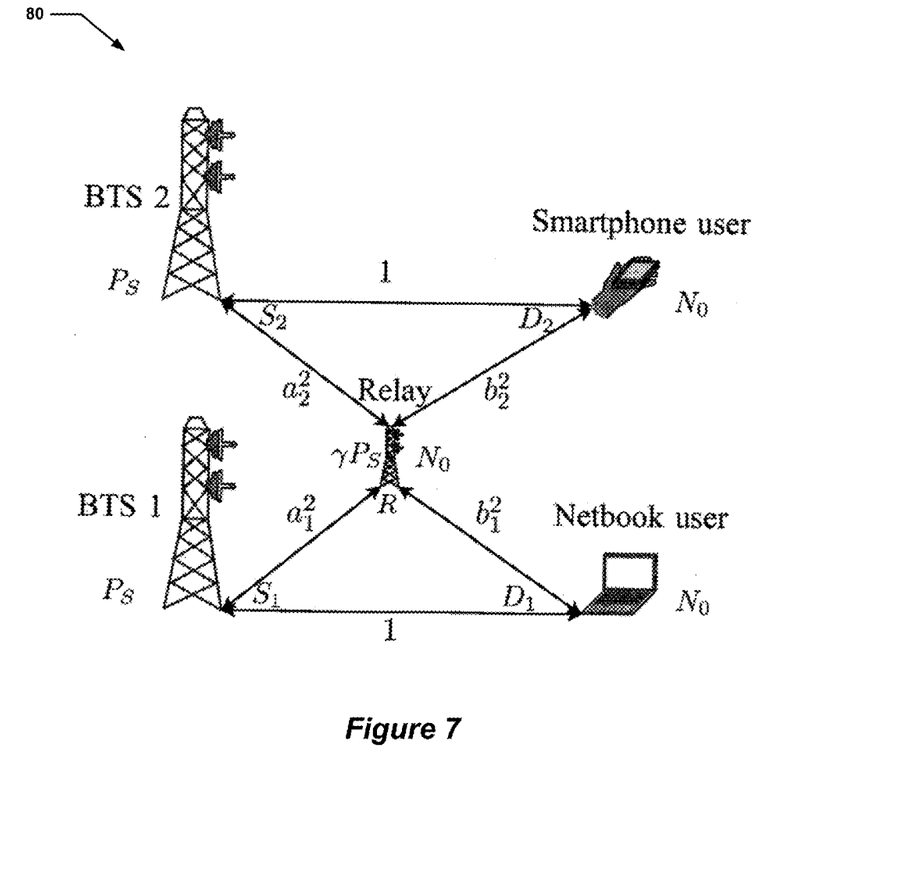
FIG. 7 depicts a block diagram of a system having a wireless butterfly channel in accordance with embodiments of the invention.

Consider the low SNR wireless butterfly 80 in FIG. 7, where two sources $S_1$ and $S_2$ have messages $x_1=(m_0, m_1)$ and $x_2=(m_2, m_3)$ interesting both destinations $D_1$ and $D_2$. In FIG. 7, the weights on the edges represent the total channel gains. It is assumed that both sources have the same power constraint $P_S$, the relay $P_R=\gamma P_S$, and the noise power is t1 1e same $N_0$ at the relay and both destinations. Consider, for example, the case where the channel gains satisfy the inequalities $1<a_1^2 \le 1+\gamma b_1^2$, $1<a_2^2 \le 1+\gamma b_2^2$ and $a_1^2+a_2^2 \le 1+\gamma b_1^2 \le 1+\gamma b_2^2$.

In the absence of relay, $S_1$ could only send $x_1$ to $D_1$, and $S_2$ could only send $x_2$ to $D_2$, both at rate $$C_O = \frac{P_s}{N_o}.$$

With relaying, but without network coding, the relay uses the peaky binning scheme described above, but not network coding. With the help of the relay, $S_1$ could send $x_1=(m_0, m_1)$ to both $D_1$ and $D_2$ at rate $$a_1^2 \frac{P_s}{N_o},$$

and $S_2$ could send $x_2=(m_2, m_3)$ to both $D_1$ and $D_2$ at rate $$a_2^2 \frac{P_s}{N_o},$$

however this would require two transmissions from the relay to make both $x_1$ and $x_2$ available at the two destinations. Therefore the long-term average throughput at each destination would be $$C_1 = \frac{(a_1^2 + a_2^2)}{2}\frac{P_s}{N_o} > C_0 = \frac{P_s}{N_o}.$$

Relaying improves the communication rate of both users, with respect to the non-relaying case.

Figure 8:
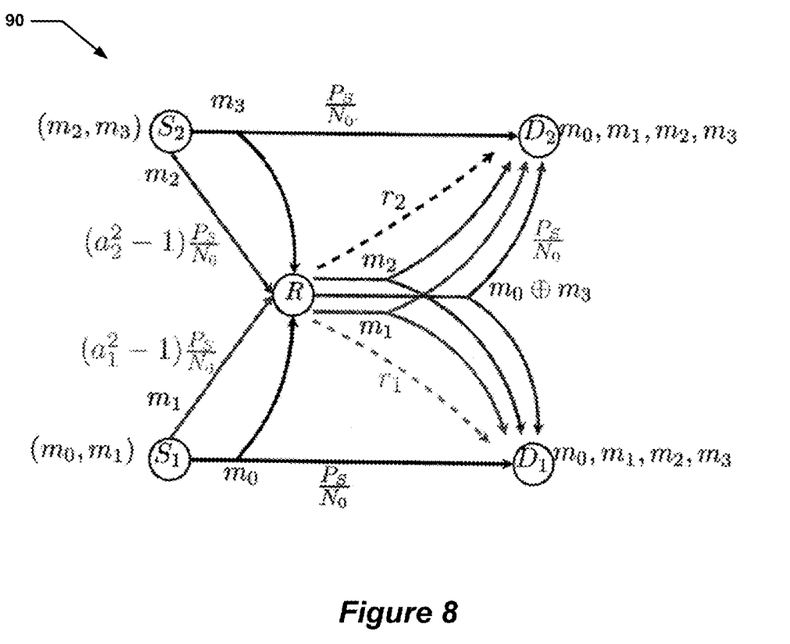
FIG. 8 depicts a hypergraph model of the system of FIG. 7 in accordance with embodiments of the invention.

Combining both relaying and network coding involves using both peaky binning relaying and network coding, the wireless butterfly can be modeled by the hypergraph 90 in FIG. 8, and the relay can make both $x_1$ and $x_2$ available $D_1$ and $D_2$ with a single retransmission. Consequently, both destinations have an average throughput equal to the hypergraph min-cut $$C_2 = \frac{(a_1^2 + a_2^2)}{2}\frac{P_s}{N_o} > C_1 > C_0.$$

This illustrates the benefits of combining low SNR relaying and network coding.

Figure 9:
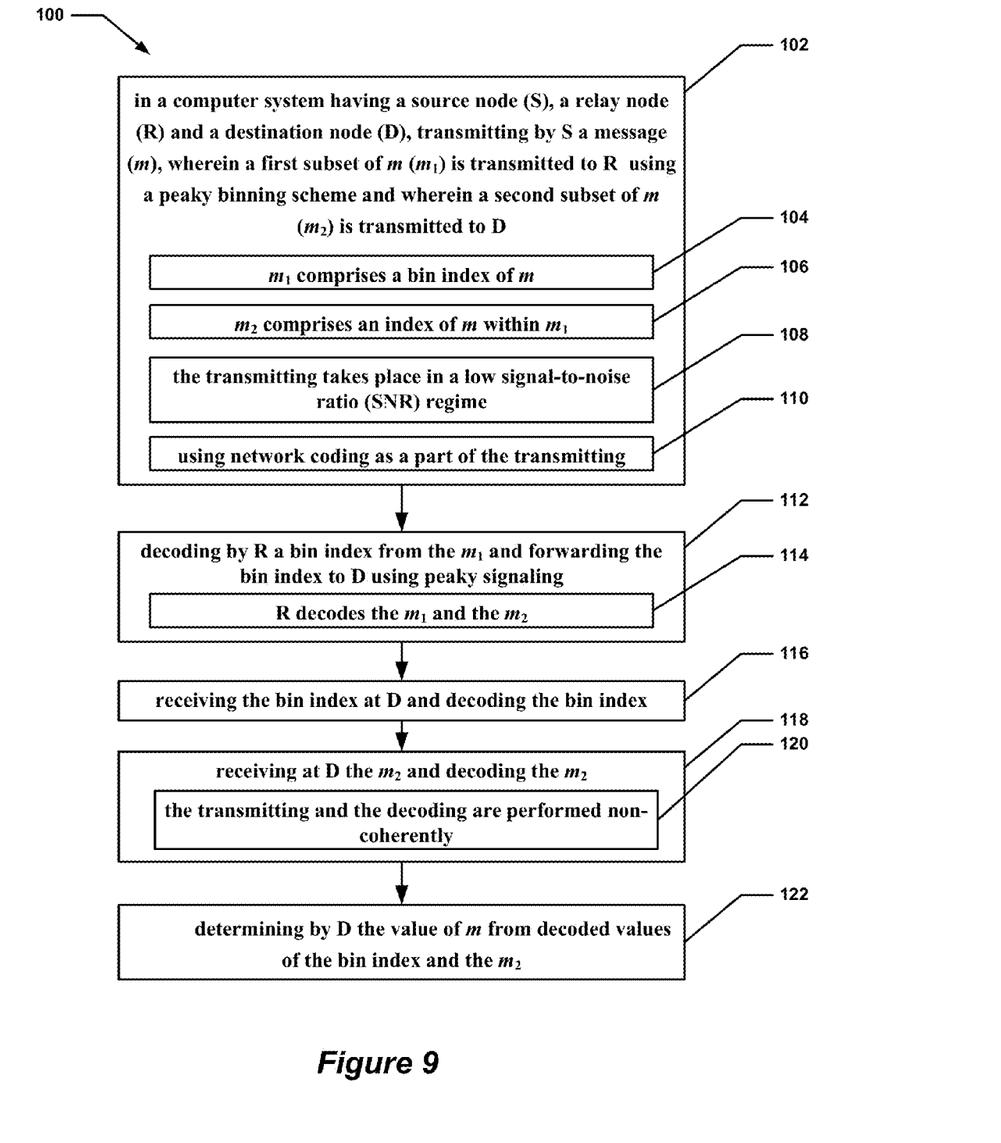
FIG. 9 depicts a flow diagram of a particular embodiment of a method for providing a peaky binning relay scheme for wideband/low SNR wireless communications in accordance with embodiments of the invention.

A flow chart of the presently disclosed method is depicted in FIG. 9. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIG. 9, a particular embodiment of a method 100 for providing a peaky binning relay scheme for wideband/low SNR wireless communications begins with processing block 102 which discloses in a computer system having a source node (S), a relay node (R) and a destination node (D), transmitting by S a message (m), wherein a first subset of m ($m_1$) is transmitted to R using a peaky binning scheme and wherein a second subset of m ($m_2$) is transmitted to D. As shown in processing block 104 $m_1$ comprises a bin index of m, and as shown in processing block 106 $m_2$ comprises an index of m within $m_1$. Processing block 108 states transmitting takes place in a low signal-to-noise ratio (SNR) regime. Processing block 110 recites using network coding as a part of said transmitting.

Processing block 112 discloses decoding by R a bin index from said $m_1$ and forwarding said bin index to D using peaky signaling. In some scenarios, as shown in processing block 114, R decodes $m_1$ and $m_2$.

Processing continues with processing block 116 which states receiving said bin index at D and decoding the bin index. Processing block 118 recites receiving at D the $m_2$ and decoding the $m_2$. As shown in processing block 120, the transmitting and the decoding are performed non-coherently.

Processing block 122 determining by D the value of m from decoded values of said bin index and said $m_2$.

As described above, the present invention increases the communication rate and decreases the energy consumption in wireless networks with low signal-to-noise ratio (SNR) operating points, e.g. cellular networks, by utilizing low SNR relaying strategies. This is accomplished by way of a peaky binning relay scheme for wideband/low SNR wireless communications.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s), laptop(s), handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the Internet, as well as a virtual network. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A computer-implemented method in a computer system having a source node (S), a relay node (R) and a destination node (D), the method comprising:
    transmitting by S a message (m), wherein a first subset of m ($m_1$) is transmitted to R using a peaky binning scheme and wherein a second subset of m ($m_2$) is transmitted to D;
    decoding by R a bin index from said $m_1$ and forwarding said bin index to D using peaky signaling;
    receiving said bin index at D and decoding said bin index;
    receiving at D said $m_2$ and decoding said $m_2$; and
    determining by D the value of m from decoded values of said bin index and said $m_2$, wherein $m_1$ comprises a bin index of m and wherein $m_2$ comprises an index of m within $m_1$.

2. The method of claim 1 wherein said transmitting takes place in a low signal-to-noise ratio (SNR) regime.

3. The method of claim 1 wherein said transmitting and said decoding are performed non-coherently.

4. The method of claim 1 further comprising using network coding as a part of said transmitting.

5. The method of claim 1 wherein said R decodes said $m_1$ and said $m_2$.

6. A non-transitory computer readable storage medium having computer readable code thereon for providing a peaky binning relaying scheme for wireless communication, the medium including instructions in which a computer system performs operations comprising:

transmitting by S a message (m), wherein a first subset of m ($m_1$) is transmitted to R using a peaky binning scheme and wherein a second subset of m ($m_2$) is transmitted to D;

decoding by R a bin index from said $m_1$ and forwarding said bin index to D using peaky signaling;

receiving said bin index at D and decoding said bin index;

receiving at D said $m_2$ and decoding said $m_2$; and determining by D the value of m from decoded values of said bin index and said $m_2$, wherein $m_1$ comprises a bin index of m and wherein $m_2$ comprises an index of m within $m_1$.

7. The computer readable storage medium of claim 6 wherein said transmitting takes place in a low signal-to-noise ratio (SNR) regime.

8. The computer readable storage medium of claim 6 wherein said transmitting and said decoding are performed non-coherently.

9. The computer readable storage medium of claim 6 further comprising using network coding as part of said transmitting.

10. The computer readable storage medium of claim 6 wherein said R decodes said $m_1$ and said $m_2$.

11. A computer system including a source node (S), a relay node (R) and a destination node (D) each of said S, R and D comprising:
   a memory;
   a processor;
   a communications interface;
   an interconnection mechanism coupling the memory, the processor and the communications interface; and
   wherein the memory is encoded with an application providing a peaky binning relaying scheme for wireless communication, that when performed on the processor, provides a process for processing information, the process causing the computer system to perform the operations of:

transmitting by S a message (m), wherein a first subset of m ($m_1$) is transmitted to R using a peaky binning scheme and wherein a second subset of m ($m_2$) is transmitted to D;

decoding by R a bin index from said $m_1$ and forwarding said bin index to D using peaky signaling;

receiving said bin index at D and decoding said bin index;

receiving at D said $m_2$ and decoding said $m_2$; and determining by D the value of m from decoded values of said bin index and said $m_2$, wherein $m_1$ comprises a bin index of m and wherein $m_2$ comprises an index of m within $m_1$.

12. The computer system of claim 11 wherein said transmitting takes place in a low signal-to-noise ratio (SNR) regime.

13. The computer system of claim 11 wherein said transmitting and said decoding are performed non-coherently.

14. The computer system of claim 11 further comprising using network coding a part of said transmitting.

15. The computer system of claim 11 wherein said R decodes said $m_1$ and said $m_2$.

* * * * *